United States Patent [19]
Fritz et al.

[11] 3,837,927
[45] Sept. 24, 1974

[54] CHEMORESISTANT ELECTRODUCTIVE SUBSTANCE AND PROCESS FOR MAKING SAME

[75] Inventors: Heinz-Peter Fritz; Wolfram Treptow, both of Munchen; Peter Faber, Kahl/Main, all of Germany

[73] Assignee: Rheinisch-Westfalisches Elektrizitatswerk A.G., Essen, Germany

[22] Filed: Aug. 7, 1972

[21] Appl. No.: 278,641

[30] Foreign Application Priority Data
Aug. 7, 1971 Germany............................ 2139722
May 10, 1972 Germany............................ 2222797
Aug. 7, 1971 Germany............................ 2139713

[52] U.S. Cl............... 148/6.3, 148/6.35, 423/81, 423/49, 423/74, 423/53, 423/62, 148/31.5
[51] Int. Cl. ........................................... C23f 7/00
[58] Field of Search ............ 423/69, 81, 74, 53, 75, 423/62; 148/6.3, 6.35, 31.5

[56] References Cited
UNITED STATES PATENTS
2,579,752   12/1951   Newell .............................. 148/6.24

Primary Examiner—Ralph S. Kendall
Attorney, Agent, or Firm—Karl F. Ross; Herbert Dubno

[57] ABSTRACT

To produce an electronically conductive substance resistant to alkalies and acids, a metal from Group IVB, VB, VIB, VIIB or VIII of the Periodic Table -- especially titanium -- is reacted in a gaseous atmosphere free from water vapor and oxygen, at temperatures between about 325° and 650°C, with chloramine or with a combination of reactants (such as ammonia and carbon tetrachloride, chloroform or sulfuryl chloride) yielding the constitutents of the chloramine radical. The metal may constitute a solid body to be coated with the reaction product forming a protective layer thereon.

12 Claims, 1 Drawing Figure

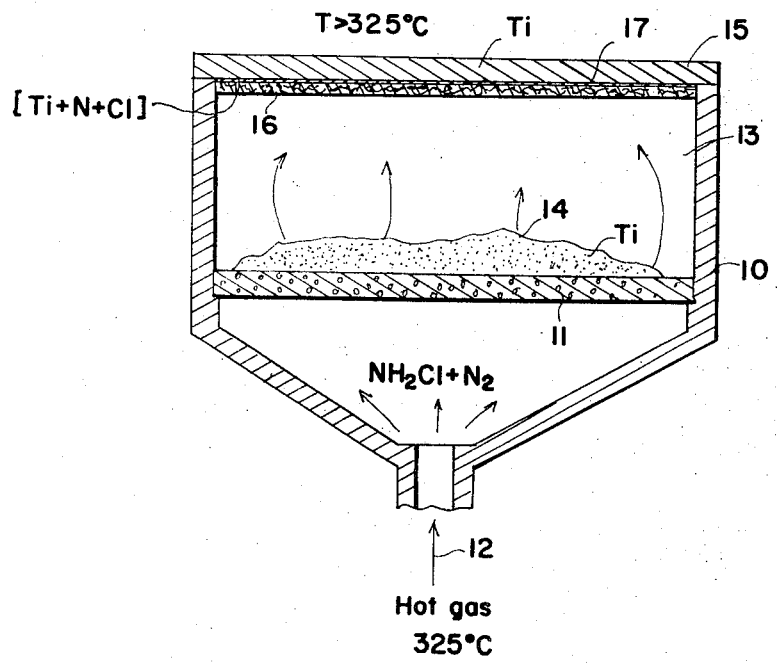

CHEMORESISTANT ELECTRODUCTIVE SUBSTANCE AND PROCESS FOR MAKING SAME

Our present invention relates to an electronically conductive substance, resistant to attack by acids and aldalies, and to a process for making same.

A substance of this nature has utility, on the one hand, as a protective (e.g., anticorrosive) coating for various substrates and, on the other hand, as a self-supporting body in an electric battery or other electrolytic environment, e.g., as a reference electrode or as an inert carrier for active electrode material.

Substances heretofore used for these purposes include such compounds as titanium nitride and tungsten carbide. Their mechanical, chemoresistive and electroconductive properties, however, are not satisfactory in all instances; titanium nitride, for example, is anodically unstable and forms rather brittle coatings on substrates of different material. Furthermore, the manufacture of these compounds is often complicated and generally requires high operating temperatures, on the order of 1,000°C or higher.

The primary object of the present invention is to provide an improved and simplified process for producing a highly refractory substance of the character set forth which can be carried out at substantially lower operating temperatures and yields a product of excellent mechanical, electrical and chemical quality. A related object is to provide an improved substance of this nature which is particularly useful as a protective coating, by virtue of its ready adherence to a variety of substrates (including nonmetallic ones), and which can withstand prolonged exposure to acidic or alkaline media.

We have found, in accordance with this invention, that the foregoing objects may be realized by a process involving the interaction of a metal with the chloramine radical, at an elevated reaction temperature in a gaseous atmosphere free from water vapor and oxygen, the metal being an element taken from Group IVB, VB, VIB, VIIB or VIII of the Periodic Table or possibly a combination of several such elements.

A particularly stable electroconductive and chemoresistant substance, according to the invention, is the reaction product of titanium with the chloramine radical. The operating temperature in the case of this metal ranges between about 325° and 500°C, being somewhat higher (up to about 650°) for other metals, especially those in Group VIB. In every instance, however, these temperatures are well below those conventionally employed in producing titanium nitride, tungsten carbide and the like.

If the reaction product is to become a protective coating on a substrate, the surface to be coated is heated to the desired operating temperature whose level, within the range indicated above, influences the reaction time. The substrate may consist of the very metal which is to be interacted; otherwise, this metal may be introduced into the hot gas in finely comminuted form. The two measures could, however, be combined if a particularly heavy layer of the protective substance is desired.

In some instances, a part of the metal may also react with the chlorine alone without nitrogen, to form an unwanted byproduct which may be deposited on or mixed with the desired composition but differs from it in solubility so as to be readily separable therefrom.

As a source of the chloramine radical required for the reaction one may use chloramine ($NH_2Cl$) itself, or a mixture of gaseous reactants yielding the constituents of this radical upon thermal decomposition. Such a mixture may include, for example, ammonia ($NH_3$) plus carbon tetrachloride ($CCl_4$), chloroform ($CHCl_3$) or sulfuryl chloride ($SOCl_2$). These constituents can also be obtained from ammonium chloride ($NH_4Cl$) by heating same to a decomposition temperature above its sublimation point, thereby splitting it into ammonia, hydrogen and chlorine. (This mode of treatment of a metal, though specifically described herein with reference to chlorine only, can be used more generally for the production of compositions of metal, nitrogen and a halogen by starting with the corresponding ammonium halide.)

The reaction time in the process of this invention compares favorably with that needed for making the conventional refractories referred to above. This reaction time can be modified by the admixture of an inert carrier with the reactant or reactants, e.g., nitrogen or a rare gas such as argon.

If the metal to be reacted is introduced in the form of a powder, it is advantageously carried into the reaction zone by the hot gas stream in such a way as to create a turbulent flow, the metal particles and the gas stream forming what is known as a fluidized bed. If the reaction product is to be deposited on a substrate, a surface of the latter exposed to the flow is heated at least to and preferably somewhat above the required reaction temperature; the particles, blown onto the surface, react in its vicinity and adhere to it. If no such adhesion is desired, the walls of the reaction chamber may be covered with an isolating layer (e.g., of quartz wool) adapted to withstand the prevailing temperatures. Such a layer could also be used to isolate the heated substrate surface from the remainder of the reaction zone; the substrate, if made from a metal of the class listed above, will then react directly with the gas (which penetrates the isolating layer) to form a protective coating thereon, whereas the powder in the chamber proper is converted into a composition according to the invention consisting of loose particles which could then be formed into a solid body, if desired, with the aid of a suitable bonding agent.

A substrate to be so coated need not have a continuous surface but could also be in filamentary or other form, e.g., as a woven cloth.

The sole FIGURE of the accompanying drawing diagrammatically illustrates the process according to the invention as applied to the treatment of titanium.

The drawing shows a generally cylindrical reaction vessel 10 of suitable refractory material with a sintered bottom plate 11 which is sufficiently porous to give passage to a stream of hot gas 12. The gas stream, consisting of chloramine and a diluent in the form of pure nitrogen, is free from water vapor and oxygen and is heated to a temperature of 325°C. The reaction chamber 13 above plate 11 contains a pile 14 of powdered titanium resting on that plate; at the top, this chamber is closed by a removable titanium plate 15 representing a substrate to be coated. An isolating layer 16 of quartz wool or the like removably underlies the plate 15 so as to hold off the particles of powder 14 which are set in whirling motion by the entering gas stream. Plate 15 is heated to a temperature T somewhat higher than that of the gas. Layer 15 could, of course, be extended to other parts of the chamber.

The titanium of plate 15 interacts with the chloramine of the gas flow 12 to form a protective coating 17 on the surface exposed to the gas flow; at the same time, the powder 14 in chamber 13 is converted into a similar composition (Ti + N + Cl).

If the layer 16 were removed, the comminuted reaction product circulating in chamber 13 would adhere to the underside of plate 15 (which in this case could consist of a different metal or be nonmetallic) to form a protective coating 17 thereon. As the temperature in the chamber drops at the end of the reaction, some chlorine may combine with the residue of the titanium powder 14 to form an undesirable salt on the coating 17 which, however, can readily be removed by mechanical as well as chemical means.

EXAMPLE I 2 grams of technically pure titanium powder 14 is exposed to the gas stream 12 for 45 minutes, the gas flowing at a rate of about 40 liters of reactant ($NH_2Cl$) and 100 liters of diluent ($N_2$) per hour through the chamber. The reaction product in chamber 13 is of dark copper color whereas the layer 17 formed on plate 15 is golden yellow. Both products exhibit a very high resistance to acids and alkalies.

EXAMPLE II

A titanium sheet is cleaned by 15-minute boiling in concentrated muriatic or oxalic acid and is then electrically heated to a temperature of about 325° to 450°C in a reaction chamber whose atmosphere is separately maintained at or above 325°C to prevent the precipitation of ammonium chloride. This atmosphere consists of a treatment gas as described above, with a molar ratio $NH_2Cl/N_2$ of about 1 : 3. A continuous, firmly adhering layer 17 is formed on the titanium sheet in about 5 minutes.

EXAMPLE III 2 grams of technically pure nickel powder is treated in the same manner as described for titanium powder with reference to the drawing and Example I. Besides nickel chloride ($NiCl_2$), which may be removed with the aid of an aqueous solution of ammonium hydroxide, the resulting product consists essentially of a composition of nickel, nitrogen and chlorine in the form of shiny crystals of light-brown color which sublimate at approximately 700°C, are highly electroconductive and are only somewhat soluble in aqua regia.

EXAMPLE IV

A workpiece of titanium, precleaned as described in Example 2, is heated in a reaction vessel to 350°C in the presence of about 2 grams of ammonium chloride. The latter, admixed with a nitrogen stream free from oxygen and water vapor, is passed over the workpiece at a rate of about 100 liters/hr. After a few minutes, a shiny gold-colored coating of the aforedescribed composition develops on the workpiece surface, turning blue with prolonged treatment. Residual ammonium chloride, sublimating at the stated temperature, may be recycled together with its inert carrier gas.

In all instances, the final reaction product may be allowed to cool off in an inert gas or in a vacuum.

A reaction temperature on the order of 400°C (ranging between about 325°C and 500°C), as given above for titanium, is also suitable for most other metals in the class defined above, specifically Zr and Hf in Group IVB, V, Nb and Ta in Group VB, Mn in Group VIIB and Fe, Co and Ni in Group VIII; temperatures between about 600° and 650°C are required for metals of Group VIB (Cr, Mo and W).

We claim:

1. A process for making a chemically resistant and electronically conductive substance, comprising the step of interacting a metal at a reaction temperature between substantially 325° and 650°C with a chloramine radical in a gaseous atmosphere free from water vapor and oxygen, said metal being selected from Groups IVB, VB, VIB, VIIB and VIII of the Periodic Table.

2. A process as defined in claim 1 wherein said metal is in the form of a solid body having a surface heated to at least said reaction temperature, the interaction product being formed on said surface as a coating for said body.

3. A process as defined in claim 1 wherein said metal is introduced into said atmosphere in comminuted form.

4. A process as defined in claim 3 wherein the comminuted metal is subjected to entrainment by a turbulent flow in said atmosphere.

5. A process as defined in claim 1 wherein said atmosphere includes an inert gas.

6. A process as defined in claim 1 wherein said metal is titanium.

7. A process as defined in claim 6 wherein said reaction temperature ranges between substantially 325° and 500°

8. A process as defined in claim 1 wherein said atmosphere contains an inert carrier and the results of thermal dissociation of ammonium chloride at a decomposition temperature above the sublimation point thereof, the interaction being followed by removal of residual ammonium chloride by sublimation.

9. A process as defined in claim 1, comprising the further step of separating an interaction product containing metal, nitrogen and chlorine from a byproduct consisting substantially entirely of a chlorine salt of the metal.

10. A chemically resistant and electronically conductive substance, consisting essentially of the product of reaction, at a temperature ranging between substantially 325°C and 650°C, of the chloramine radical with a metal selected from Groups IVB, VB, VIB, VIIB and VIII of the Periodic Table.

11. A substance as defined in claim 10 wherein said metal is titanium.

12. A substance as defined in claim 10 forming a protective layer on a substrate of said metal.

* * * * *